Figure 1:
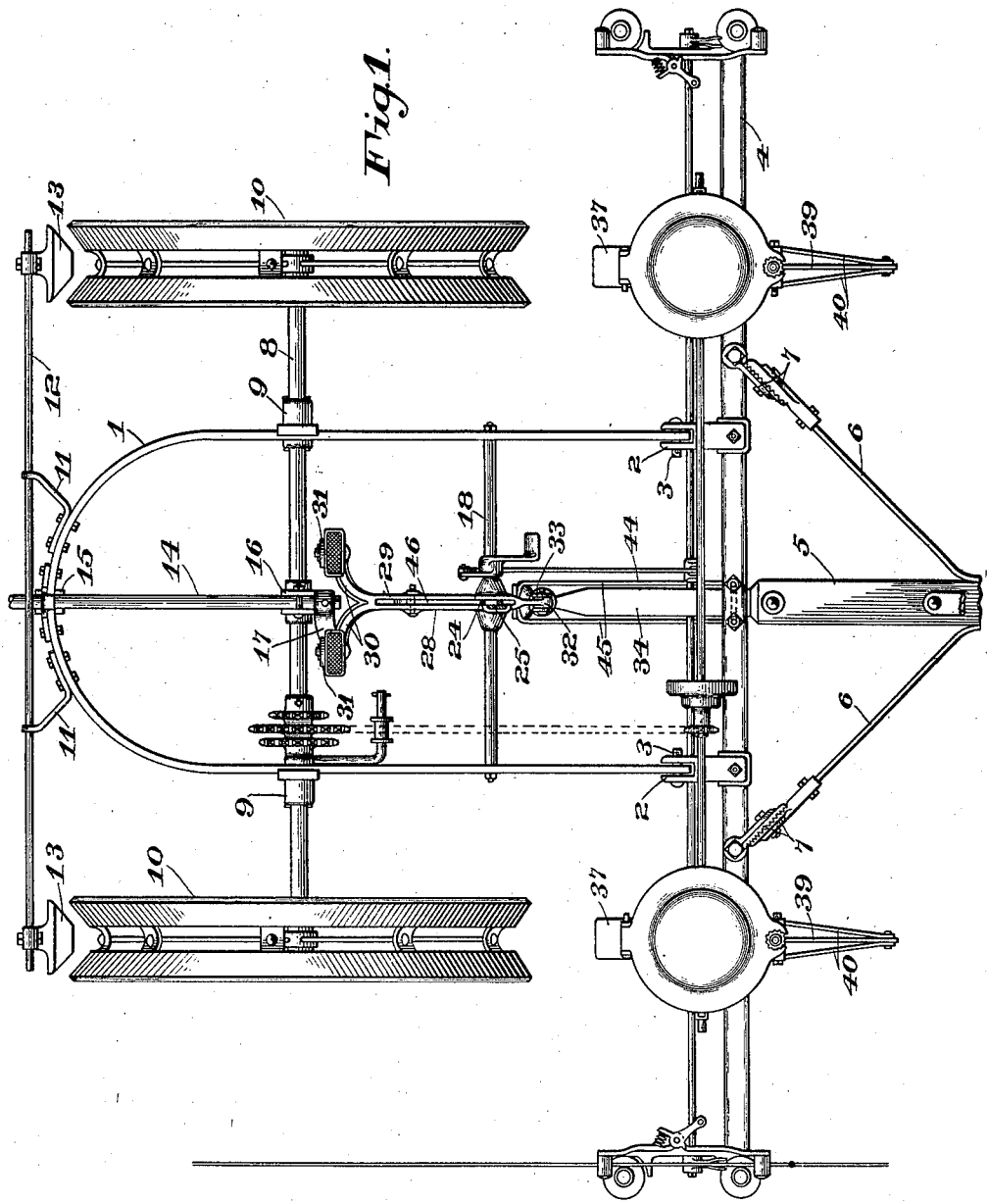

S. K. DENNIS.
CORN PLANTER.
APPLICATION FILED APR. 26, 1911.

1,001,736.

Patented Aug. 29, 1911.

3 SHEETS—SHEET 1.

Witnesses:
C. C. Palmer.
F. W. Hoffmeister.

Inventor.
Samuel K. Dennis.
By E. W. Burges
Attorney.

S. K. DENNIS.
CORN PLANTER.
APPLICATION FILED APR. 26, 1911.
1,001,736.
Patented Aug. 29, 1911.
3 SHEETS—SHEET 2.
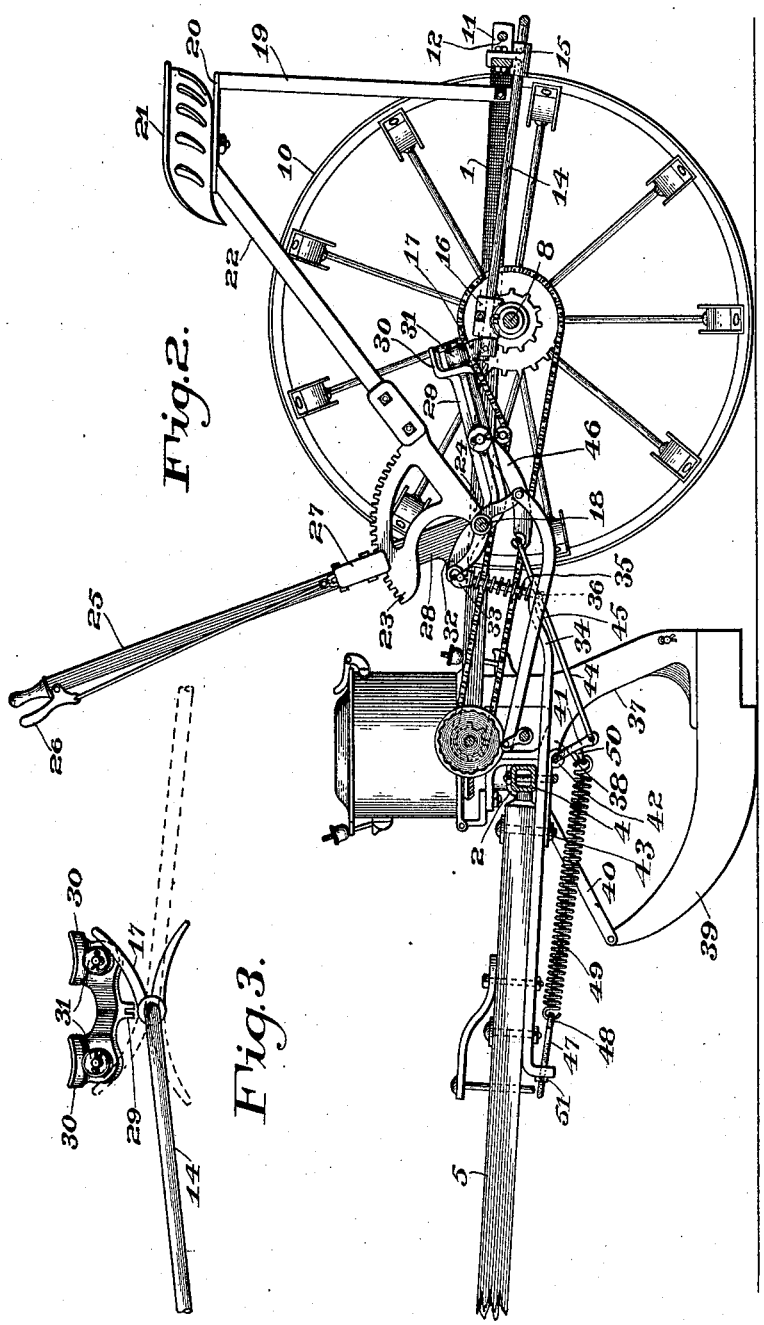
Witnesses:
C. C. Palmer.
F. W. Hoffmeister.
Inventor.
Samuel K. Dennis.
By E. W. Burgess
Attorney.

S. K. DENNIS.
CORN PLANTER.
APPLICATION FILED APR. 26, 1911.
1,001,736.
Patented Aug. 29, 1911.
3 SHEETS—SHEET 3.
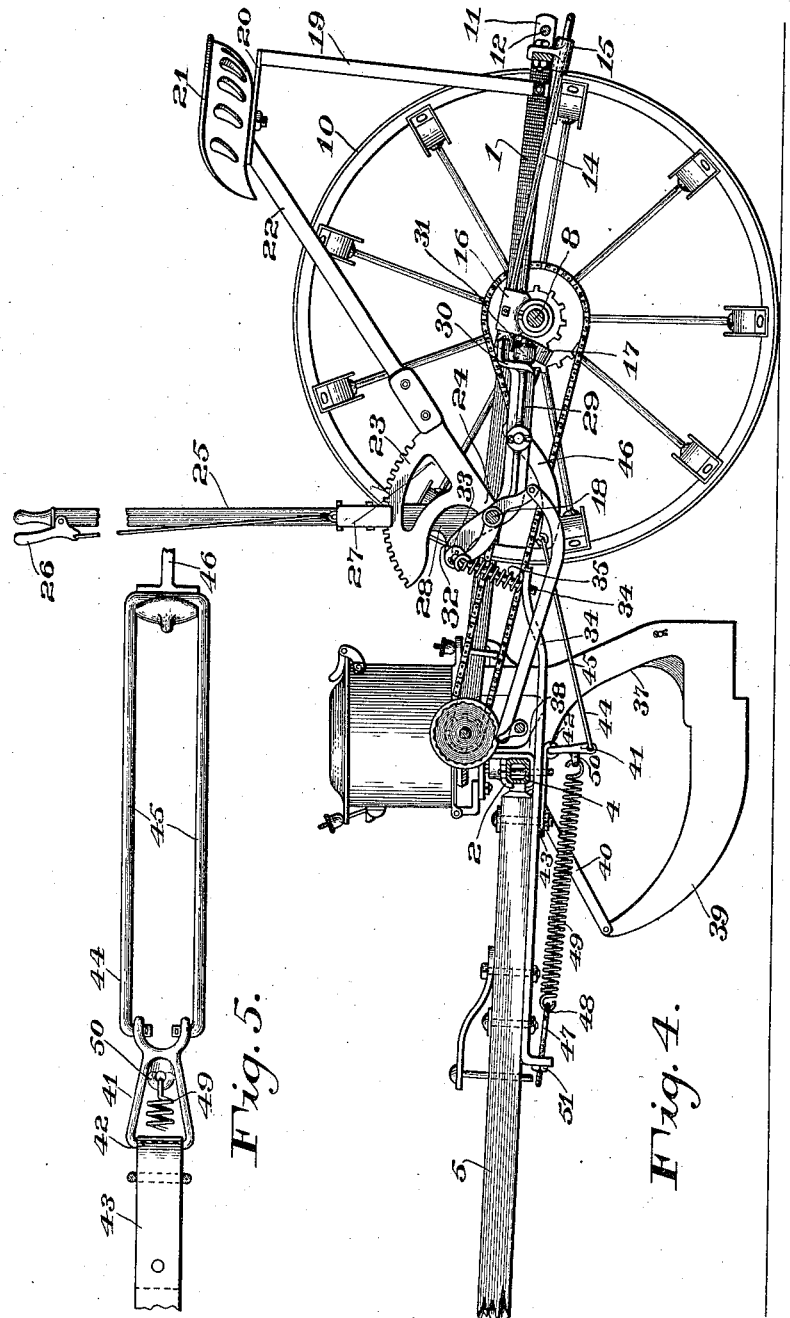
Witnesses:
C. C. Palmer
F. W. Hoffmeister.
Inventor.
Samuel K. Dennis.
By E. W. Burgett
Attorney.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,001,736.      Specification of Letters Patent.     Patented Aug. 29, 1911.

Application filed April 26, 1911. Serial No. 623,341.

*To all whom it may concern:*

Be it known that I, SAMUEL K. DENNIS, a citizen of the United States, residing at Chicago, in the county of Cook and State of Illinois, have invented certain new and useful Improvements in Corn-Planters, of which the following is a specification.

My invention relates to corn planters, and in particular to mechanism whereby the furrow openers and the draft frame carrying the seed dropping mechanism are raised or lowered relative to the wheel frame, and it consists in an improved spring counterbalancing mechanism connected with the draft and wheel frames in a manner assisting the operator in effecting the desired adjustment thereof; the object of my invention being to provide a mechanism simple and strong in construction and efficient in operation. This object is attained by means of the mechanism illustrated by the accompanying drawing, in which—

Figure 1 represents a top plan view of a corn planter having my invention forming a part thereof; Fig. 2 is a side elevation of part of Fig. 1; Fig. 3 is a detached detail of part of Fig. 2, designed to show the connection between the raising and lowering mechanism and the automatically adjustable marker carrying arm; Fig. 4 is a side elevation of Fig. 1 similar to Fig. 2, and designed to show the manner of adjusting the draft frame relative to the wheel frame; and Fig. 5 represents a detached detail of the spring counterbalancing mechanism.

The same reference characters designate like parts throughout the several views.

1 represents the wheel frame of a planter, including a U-shaped member having the front ends of its side members pivotally connected to draft brackets 2 by means of pins 3, the draft brackets being secured to a transverse draft bar 4, having a draft tongue 5 adjustably connected therewith by means of tongue brace members 6 that have their rear ends connected with the draft bar by means of interlocking pivotally connected bracket members 7, whereby the draft tongue may be adjusted at its front end to a higher or lower plane relative to the draft frame.

8 represents an axle journaled in bearings 9 secured to the side members of the wheel frame and having carrying and traction wheels 10 mounted upon the opposite ends thereof.

11 represents bracket members secured to the rear end of the wheel frame, and 12 a transverse rock shaft journaled in the brackets and having wheel scrapers 13 secured to opposite ends thereof.

14 represents a longitudinally arranged rock shaft having its middle portion journaled in a bearing 15 secured to the wheel frame, and its forward end in a bearing 16 mounted upon the axle.

17 represents a fork member secured to the front end of shaft 14, and a marker carrying arm (not shown) may be secured to its rear end.

18 represents a fixed shaft forward of the axle, having the opposite ends thereof secured to the side members of the wheel frame.

19 represents seat supporting bars having their lower ends secured to the rear ends of the side members of the wheel frame, and their upper ends to a bar 20, to which is secured a seat 21, and 22 represents a forwardly and downwardly inclined bar having its upper end secured to bar 20, and its lower end to a toothed sector 23 concentric with the fixed shaft 18 and having a leg member 24 that is mounted upon said shaft.

25 represents a hand lever provided with a common form of thumb lever 26 and sliding detent mechanism 27 adapted to engage with the toothed sector in a well-known manner to retain the lever in any desired position of adjustment. The lower end of the hand lever is secured to an L-shaped bracket member 28 that is pivotally mounted upon the fixed shaft 18 in a manner to rock thereon and provided with a rearwardly projecting arm 29, said arm being provided at its rear end with laterally diverging fork members 30 adapted to form foot rest members, and 31 represents rollers journaled upon the foot rest members and adapted to engage with the fork member 17 of the marker operating mechanism.

32 represents a forwardly projecting arm forming part of bracket member 28, to which is pivotally connected the upper end of a link 33, the lower end of the link being slidably received by an opening in the rear end of a bar 34 that is secured to the draft tongue, and 35 represents a compression spring that surrounds the link and operative between the bar and a shoulder at the upper end of the link to yieldingly press downward upon the bar when the hand lever is moved in a forward direction, and a pin 36 prevents the link from disengagement from the bar when the hand lever is moved in an opposite direction.

37 represents a seed conduit having a forwardly extending bracket portion 38 at its upper end whereby it is secured to the draft bar 4, and 39 represents furrow opening shoes having their rear ends secured to the lower end of the seed conduit and their forward upturned ends connected with the bracket portion 38 by means of brace members 40.

41 represents a depending swinging link having its upper end pivotally connected with an eye portion 42 at the rear end of a clip member 43 that is secured to the lower side of the bar 34 intermediate its ends. The lower end of link 41 is provided with transverse openings that receive the forward end of a yoke member 44, the yoke including side members 45 that are spaced apart in a manner to allow the rear end of bar 34 to pass between them when the hand lever is thrown in a forward direction toward the limit of its movement, the rear end of the yoke engaging with the forward hooked end of a link 46 that has its rear end pivotally connected with the arm 29 intermediate its ends. The front end of bar 34 is turned downward and provided with a longitudinally arranged opening that adjustably receives the front threaded end of a link 47 that is provided at its rear end with an eye 48 whereby it is connected with the forward end of a counterbalancing spring 49, the spring having its rear end connected with an eye portion 50 intermediate the ends of the swinging link 41. Link 47 is provided with a nut 51 whereby the tension of the counterbalancing spring may be regulated.

When the hand lever is moved forward about its pivot the compression spring 35 yieldingly rocks the draft frame about its pivotal connection with the wheel frame in a manner to cause the furrow opening shoes to penetrate a greater or less depth in the ground, and when it is moved rearward the link 33 lifts the rear end of bar 34 and thereby rocks the draft frame in an opposite direction in a manner to raise the shoes from the ground, as shown in Fig 4, the counterbalancing spring assisting the effort of the operator, and the two forces may be supplemented by means of pressure upon the foot rest in a downward direction, the downward swing of the foot rest operating to rock the marker carrying rock shaft in a manner to carry the marker from one side of the machine to the opposite side thereof.

What I claim as my invention, and desire to secure by Letters Patent, is:

1. A corn planter including, in combination, a draft frame, a wheel frame having its forward end pivotally connected with said draft frame, a draft tongue connected with said draft frame, a hand lever pivotally mounted upon said wheel frame, a bar secured to said tongue and extended toward said wheel frame, a link connection between the rear end of said bar and said hand lever, a pendent swinging link having one end pivotally connected with said tongue, a rearwardly disposed link connection between the opposite end of said link and said hand lever, said link connection with said hand lever being below the axis thereof, and a forwardly disposed counterbalancing spring connecting the opposite side of said swinging link with said draft tongue.

2. A corn planter including, in combination, a draft frame, a wheel frame having its forward end pivotally connected with said draft frame, a draft tongue connected with said draft frame, a hand lever pivotally mounted upon said wheel frame and having forwardly and rearwardly extending arms forming a part thereof, a bar secured to said draft tongue and extended rearward therefrom toward said hand lever, and a link connection between the rear end of said bar and the forwardly extending arm of said hand lever, a pendent swinging link having one end pivotally connected with said draft tongue, the opposite end of said link being flexibly connected with the rearwardly extending arm of said hand lever, said flexible connection including a yoke having side members spaced apart in a manner to receive the rear end of the draft tongue extension between them, and a counterbalancing spring connecting said swinging link with said draft tongue.

3. A corn planter including, in combination, a draft frame, a wheel frame having its forward end pivotally connected with said draft frame, a draft tongue connected with said draft frame, a hand lever pivotally mounted upon said wheel frame and having forwardly and rearwardly extending arms forming a part thereof, said rearwardly extending arm being provided with rearwardly diverging fork members adapted for foot rests, a bar secured to said draft tongue and extended rearward therefrom toward said hand lever, and a link connection between the rear end of said bar and the forwardly extending arm of said hand lever, a pendent swinging link having one end pivotally connected with said draft tongue, the opposite end of said link being flexibly connected with the rearwardly extending arm of said hand lever, said flexible connection including a link having its rear end pivotally connected with said arm and its forward end with the rear end of a yoke, said yoke having side members spaced apart in a manner to receive the rear end of the
5 draft tongue extension between them and having their forward ends pivotally connected with the lower end of said pendent link, and a counterbalancing spring connecting said swinging link with said draft tongue.

SAMUEL K. DENNIS.

Witnesses:
 EVAN EVANS,
 HERBERT DEKKER.